United States Patent
Chauvet

(10) Patent No.: US 8,840,023 B2
(45) Date of Patent: Sep. 23, 2014

(54) SELF-PARAMETERISING RFID ANTENNA EXTENDER

(75) Inventor: Francis Chauvet, Mouthiers (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 120 days.

(21) Appl. No.: 13/509,123

(22) PCT Filed: Nov. 10, 2010

(86) PCT No.: PCT/EP2010/067213
§ 371 (c)(1),
(2), (4) Date: May 10, 2012

(87) PCT Pub. No.: WO2011/067084
PCT Pub. Date: Jun. 9, 2011

(65) Prior Publication Data
US 2012/0248186 A1 Oct. 4, 2012

(30) Foreign Application Priority Data
Dec. 1, 2009 (FR) ...................... 09 58541

(51) Int. Cl.
*G06K 7/00* (2006.01)

(52) U.S. Cl.
USPC .......................................... 235/439; 235/492

(58) Field of Classification Search
USPC ................................ 235/439, 492
See application file for complete search history.

(56) References Cited

U.S. PATENT DOCUMENTS

| 6,839,035 | B1 | 1/2005 | Addonisio et al. |
| 8,360,324 | B2 * | 1/2013 | Shioya et al. ............... 235/492 |
| 8,378,523 | B2 * | 2/2013 | Cook et al. ................... 307/104 |
| 2005/0125093 | A1 | 6/2005 | Kikuchi et al. |
| 2007/0008139 | A1 | 1/2007 | Saarisalo et al. |
| 2007/0222603 | A1 * | 9/2007 | Lai et al. .................... 340/572.7 |
| 2007/0285255 | A1 | 12/2007 | Tsushima et al. |

FOREIGN PATENT DOCUMENTS

| EP | 1 521 206 | 4/2005 |
| EP | 1 865 445 | 12/2007 |

OTHER PUBLICATIONS

International Search Report issued on Apr. 28, 2011 in PCT/EP10/067213 filed on Nov. 10, 2010.

* cited by examiner

Primary Examiner — Daniel St Cyr
(74) Attorney, Agent, or Firm — Oblon, Spivak, McClelland, Maier & Neustadt, L.L.P.

(57) ABSTRACT

An antenna extender configured to be coupled electromagnetically to an RFID read/write station. The extender includes a first circuit oscillating at variable frequency and a second oscillating circuit coupled to the first oscillating circuit, and a processing unit which is powered by energy supplied by the second oscillating circuit when the extender is placed close to the read/write station. The processing unit includes a mechanism to measure voltage at terminals of the second oscillating circuit and a controller that can be used to vary resonance frequency of the first oscillating circuit as a function of the value of the measured voltage to optimize frequency tuning between the extender and the read/write station.

19 Claims, 1 Drawing Sheet

SELF-PARAMETERISING RFID ANTENNA EXTENDER

The present invention pertains to the realm of Radio-Frequency Identification, also called RFID, which allows an RFID read/write station (also called an RFID station or RFID reader) to be able to exchange data with one or more RFID tags (also called a transponder or smart label) when they are placed near the RFID station in a zone called the zone of detection of the station. In particular, the invention pertains to an antenna extender (also called a field expander) which is intended to be coupled electromagnetically with the antenna of an RFID station so as to modify the zone of detection of this station, that is to say to increase the RFID station's detection area and/or distance.

Systems for exchanging data by RFID technology are already widely used, especially in industry, for recognizing and/or identifying in a minimum of time any type of object bearing an RFID tag placed a short distance away, by using radio waves. The RFID station possesses an antenna formed by an oscillating circuit in which it is possible to create or pick up an electromagnetic field which allows wireless communication by electromagnetic coupling (also called inductive coupling) with any oscillating circuit placed in a zone of detection of the RFID station, for example with the antenna of an RFID tag. Generally, the binary data are exchanged between a station and a tag by amplitude modulation and/or phase modulation of the carrier frequency of the electromagnetic signal.

An RFID tag is thus capable of receiving a radio signal and of sending back in response a different signal containing a relevant item of information. It possesses a memory which makes it possible to store diverse information regarding identification, recognition and/or process. Certain tags allow only the reading of previously stored data when a station is placed nearby but others allow, in addition, the writing of the data (single or multiple writing) stored in the tag.

Moreover, in the case of a so-called passive tag, the electromagnetic signal (carrier) created by the antenna of the RFID station also serves to electrically power the tag when the latter enters the zone of detection of the station. The energy picked up by the antenna of the tag is in fact transformed into electrical energy which powers the internal circuits (memory, processing unit, etc.) of this tag. By using the power produced by the electromagnetic field of the station, the tag therefore presents the advantage of not requiring any internal power supply such as a cell or a battery.

As there are numerous applications where the standard zone of detection of an RFID read/write station exhibits overly limited dimensions which make the reading/writing of a tag difficult, it is already known to use an RFID antenna extension device. An RFID antenna extender generally comprises an LC oscillating circuit, comprising a coil L and a capacitor C. This oscillating circuit possesses dimensions greater than those of the antenna of the read/write station and is positioned between the antenna of the station and the tags to be read/written. It then makes it possible to expand the zone of detection of the station. The LC oscillating circuit of the extender is therefore coupled electromagnetically with the antenna of the RFID station. Preferably, the extender is a distinct product separate from the RFID station, so as to use it only in the cases of use where it is desired to increase the zone of detection of a station of standard range, for example. Documents EP1385120, FR2896898 and EP1309938 already describe extension devices making it possible to expand the range of an RFID antenna.

To operate properly, an extender must be tuned to the same resonance frequency as the read/write station. Now, the conditions of use and the environment influence the tuning of the oscillating circuit of the RFID station with that of the extender. The variations in the frequency of the oscillating circuit of an RFID station are small, since the station is generally shielded. On the other hand, as a function of the changes of environment, the variations in the frequency of the oscillating circuit of an extender are much more significant, depending on the applications. There is therefore a risk of an increase in losses which leads, for one and the same tag/extender distance, to a decrease in the power transmitted to the tag with which one wishes to communicate and therefore implicitly a decrease in the reading/writing distance.

Disposing a shield around the extender is a solution which would be expensive and difficult to carry out. Moreover, performing an adjustment of the tuning of an extender with an RFID station is constraining since, for each different application, it would be necessary to tune it in its final environment of use to the same frequency as the RFID station. This would require expensive measurement apparatuses and the presence of a specialist for each installation of an extender.

Therefore, the aim of the invention is to propose an antenna extension device which is capable of self-parametrizing, that is to say of parametrizing itself in an autonomous manner, that is to say without having to link it up to an exterior energy source and without the assistance of a person or of an external apparatus, and which is capable of tuning itself automatically to the resonance frequency of the read/write station with which it is coupled. By virtue of this learning function (also called self-parametrization or self-tuning), such an antenna extender may be installed very simply and rapidly with any read/write station, when it is desired to increase the zone of detection of this station.

Accordingly, the invention describes an antenna extender intended to be coupled electromagnetically to an RFID read/write station, the extender comprising a first variable-frequency oscillating circuit and a second oscillating circuit coupled with the first oscillating circuit. The extender comprises a processing unit which is powered by the energy provided by the second oscillating circuit when the extender is placed near the read/write station, and the processing unit comprises means for measuring a voltage across the terminals of the second oscillating circuit and comprises control means capable of varying the resonance frequency of the first oscillating circuit as a function of the value of the measured voltage, so as to optimize the frequency tuning between the extender and the read/write station.

According to one characteristic, the control means vary the resonance frequency of the first oscillating circuit so as to obtain a maximum value of the measured voltage.

According to another characteristic, the first oscillating circuit comprises a variable capacitor and the control means vary the value of the variable capacitor.

The invention also describes a system for exchanging data comprising an RFID read/write station, an antenna extender and at least one RFID tag, the RFID read/write station being able to communicate with the RFID tag by electromagnetic coupling by means of the antenna extender.

The invention also describes a method of optimizing frequency tuning of an antenna extender coupled electromagnetically with an RFID read/write station, the extender comprising a processing unit, a first oscillating circuit and a second oscillating circuit. The processing unit measures a voltage across the terminals of the second oscillating circuit and varies the resonance frequency of the first oscillating circuit as a function of the value of the measured voltage, so as to obtain a maximum value of the measured voltage.

Other characteristics and advantages will be apparent in the detailed description which follows while referring to an embodiment given by way of example and represented by the appended drawings in which.

Figure 1:
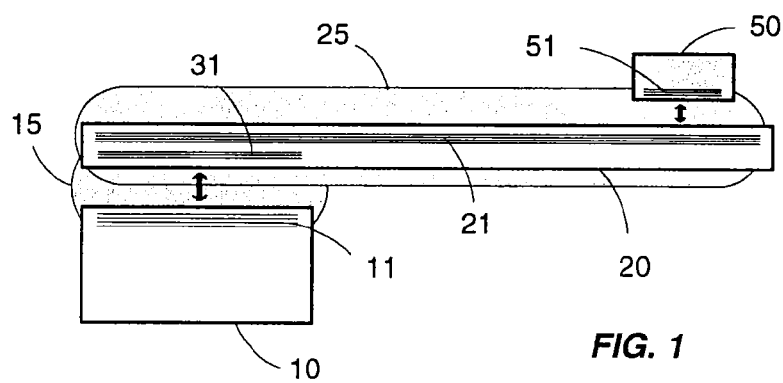
FIG. 1 shows a system for exchanging data in accordance with the invention.
Figure 2:
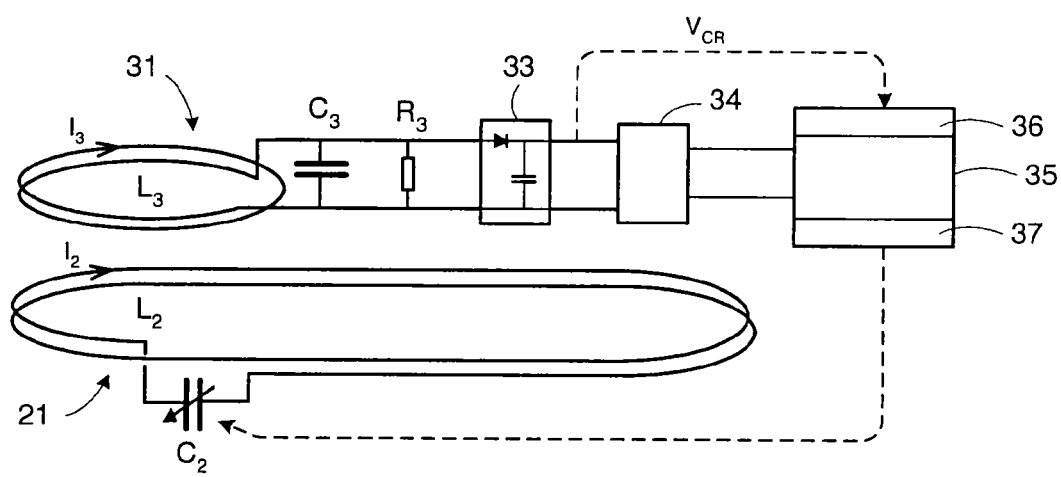
FIG. 2 represents an exemplary embodiment of an antenna extender functional layout, FIG. 3 details an exemplary embodiment of a variable capacitor of the extender.

With reference to FIGS. 1 and 2, a system for exchanging data by RFID technology comprises an RFID read/write station 10 comprising an antenna 11 formed by an oscillating circuit and at least one RFID tag 50 comprising an antenna 51 also formed by an oscillating circuit. The RFID read/write station 10 is capable of emitting an electromagnetic signal in a detection zone 15 which corresponds to the standard range of the station 10. The nominal emission frequency of the RFID read/write station 10 is for example 13.56 MHz, complying in particular with the ISO14443A or ISO14443B standard. This nominal emission frequency may vary slightly, depending on the components used for the RFID station 10 and the way they evolve over time.

The system for exchanging data also comprises an antenna extender 20, the function of which is to increase the zone of detection of the station 10 and therefore to increase the range of the station 10. The extender 20 comprises a first oscillating circuit 21 and a separate second oscillating circuit 31. The first oscillating circuit 21 and the second oscillating circuit 31 are coupled together electromagnetically, but do not have any direct electrical connection. When the extender 20 is placed near the station 10, that is to say in the standard detection zone 15, it is then coupled electromagnetically with the station 10 and it allows the station 10+extender 20 assembly to exhibit a widened detection zone 25. Thus any tag 50 situated inside this widened detection zone 25 will be capable of communicating with the RFID read/write station 10 by electromagnetic coupling, by way of the extender 20.

The main function of the first oscillating circuit 21 of the extender 20 is to expand the zone of detection of the station 10; it therefore comprises expanded dimensions. It is composed of a coil L2 and of a capacitor C2. According to the invention, at least the coil L2 or the capacitor C2 is variable so as to be able to modify the resonance frequency of the first oscillating circuit 21.

The main function of the second oscillating circuit 31 of the extender 20 is to electrically power the electronic circuits of the extender 20 on the basis of the signal that it receives by electromagnetic coupling with the station 10. In the embodiment presented, it is composed of a coil L3 and optionally of a capacitor C3 and possesses a substantially constant resonance frequency.

The extender 20 comprises a processing unit 35. This processing unit 35 comprises means 36 for measuring an electrical quantity representative of the voltage across the terminals of the second oscillating circuit 31 or of the current flowing in the second oscillating circuit 31. The processing unit 35 also comprises control means 37 capable of modifying the value of the capacitor C2 and/or of the coil L2 with the aim of varying the resonance frequency of the first oscillating circuit 21.

The processing unit 35 is powered electrically by the energy provided by the second oscillating circuit 31 when the extender 20 is placed near the RFID station 10, in such a way that the second oscillating circuit 31 is situated in the field of the standard zone of detection 15 of the station 10. Accordingly, the extender 20 comprises a power supply module 34 which is for example a linear power supply with ballast transistor or else a chopped power supply. This power supply module 34 receives as input a voltage originating from the second oscillating circuit 31 and delivers as output a stabilized DC voltage, sufficient to power the circuits of the extender 20, in particular the processing unit 35.

Advantageously, the antenna extender according to the invention is an autonomous apparatus. It does not need to be linked up electrically to an external power supply source and neither does it need to use an internal power supply source, such as a cell. It is therefore a very simple and inexpensive apparatus which is powered solely by electromagnetic coupling with an RFID read/write station 10.

According to a preferred embodiment of the invention, the measurement means 36 measure a peak voltage $V_{CR}$ delivered by the second oscillating circuit 31 across the terminals of a load R3 in series with the coil L3. Accordingly, the extender 20 comprises a peak detector module 33 which provides as output the peak voltage $V_{CR}$. In a known manner, the peak detector module 33 is for example composed of a diode and of a capacitor in parallel, as indicated in FIG. 2. The peak voltage $V_{CR}$ is also used as input for the power supply module 34. The measurement means 36 comprise an analog/digital converter making it possible to deliver a digital value of the peak voltage $V_{CR}$ to the processing unit 35. The load R3 may be a simple resistor or a current generator, to avoid overly large consumption.

It could also be envisaged that the measurement means 36 measure other electrical quantities representative of the voltage across the terminals of the second oscillating circuit 31, such as the mean voltage or the effective voltage. Nonetheless, these voltages are more difficult to measure and their measurements consume more energy. Likewise, within the framework of the present invention, it is obvious that, for a person skilled in the art, it would be equivalent that the measurement means 36 measure a current $I_3$ flowing around the coil $L_3$ of the second oscillating circuit 31, rather than measure a voltage across the terminals of the second oscillating circuit 31.

When the extender is coupled with an RFID read/write station 10, the value of the peak voltage $V_{CR}$ measured by the measurement means 36 is directly dependent on the frequency tuning between on the one hand the resonance frequency of the station 10 and on the other hand the resonance frequency of the assembly of the two oscillating circuits 21, 31 of the extender 20. This implies that a variation in the resonance frequency of the first oscillating circuit 21 automatically leads to a variation in the value of the peak voltage $V_{CR}$ delivered by the second oscillating circuit 31.

When the control means 37 modify the value of the capacitor C2, this varies the resonance frequency of the first oscillating circuit 21. The measurement means 36 are then capable of detecting the influence that this variation brings about on the tuning between the resonance frequencies of the station 10 and of the extender 20. In practice, this frequency tuning will be optimal when the measured peak voltage $V_{CR}$ is a maximum.

In the exemplary embodiment described hereinabove, the control means 37 vary the resonance frequency of the first oscillating circuit 21 by altering the value of the variable capacitor C2. Another equivalent embodiment would be to use a variable inductance L2 whose value can be modified by the control means 37.

The processing unit 35 therefore executes a method for optimizing frequency tuning between an RFID read/write station and an antenna extender coupled electromagnetically with the RFID station. This optimization method allows the extender 20 to self-parametrize, that is to say to optimize its own resonance frequency so as to be best matched with its environment of use and with the RFID read/write station 10 to which it is coupled.

The optimization method consists of a learning of the extender 20: the processing unit 35 orders the control means 37 to modify the capacitor C2, and then analyzes the direction of variation of the peak voltage $V_{CR}$ measured by the measurement means 36, brought about by this modification. If a variation of the capacitor C2 leads to an increase in the peak voltage $V_{CR}$, then this implies that the frequency tuning has improved. Conversely, if a variation of the capacitor C2 leads to a decrease in the peak voltage $V_{CR}$, then this implies that the frequency tuning has deteriorated.

The learning therefore consists simply in making successive modifications of the value of the capacitor C2 and in detecting the direction of variation of the peak voltage $V_{CR}$ that this generates. The learning terminates when a maximum value of the peak voltage $V_{CR}$ is attained, this corresponding to optimal frequency tuning. Advantageously, no user intervention and no exterior means are required in order to perform this learning.

The learning would be done in an identical manner by using another electrical quantity, such as mean voltage, effective voltage or current in the second oscillating circuit 31, instead of the peak voltage $V_{CR}$.

Several solutions exist for varying the capacitor C2 of the first oscillating circuit 21. In a first solution, the capacitor C2 comprises one or more variable-capacitance diodes (also called varicap or varactor), which have a value of capacitance which varies as a function of the reverse voltage level applied to the cathode. The control means 37 then comprise for example an analog output making it possible to modulate the value of this reverse voltage applied and therefore to vary the value of the capacitor C2.

Figure 3:
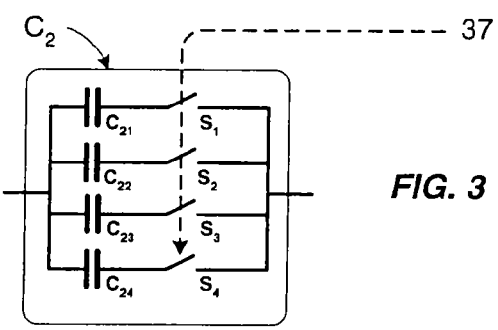

In a second solution represented in FIG. 3, the capacitor C2 comprises several capacitors C21, C22, C23, C24 linked in parallel and each switchable by switches S1, S2, S3, S4. The switches S1, S2, S3, S4 are bistable and are controlled by the control means 37, by virtue of an opening signal and a closing signal per switch. Thus, the closing or the opening of each switch connects or disconnects the corresponding capacitor C21, C22, C23, C24, thereby varying the overall value of the capacitor C2. Preferably, different weights are chosen for each of the values of the capacitors C21, C22, C23, C24, such as for example C21=X, C22=2*X, C23=4*X, C24=8*X, so as to cover a wider span of distinct values for the capacitor C2 by combining the closings/openings of the switches.

Moreover, the first oscillating circuit 21 can also comprise a fixed additional capacitor linked in parallel with the variable capacitor C2, with the aim of providing a fixed base value to the resonance frequency of the first oscillating circuit 21. Thus, the variations of the variable capacitor C2 then serve merely to adjust the resonance frequency around this fixed base value, thereby allowing more precise adjustment.

The learning may be performed each time the processing unit 35 is powered up, that is to say at the moment at which the extender 20 is placed near a station 10. The processing unit 35 may also decide to perform learning periodically so as to carry out dynamic tuning, that is to say to ensure that the system for exchanging data remains properly tuned permanently, despite possible variations in the environment, for example. The processing unit 35 could also decide to perform learning in other circumstances, for example when it detects an abrupt variation in the peak voltage $V_{CR}$.

Moreover, when the extender 20 is powered up again, it is preferable to restart the learning with the last value of the variable capacitor C2 used before the power supply was cut off, to avoid redoing the entire learning. This implies for example that the processing unit 35 saves in a backup memory the adjustment corresponding to the last value of the capacitor C2 or that the switches used to embody the variable capacitor C2 keep their state when the power supply is cut off.

The processing unit 35 may be embodied on the basis of a microcontroller or a microprocessor, preferably having low electrical consumption. The measurement means 36 and the control means 37 can equally well be integrated directly into the microcontroller or be installed in distinct components connected to the microcontroller.

To optimize the power supply for the processing unit 35, it is also possible to envisage placing, in series with the coil L2 of the first oscillating circuit 21, a power supply switch of normally open type (off), controlled by the control means 37. On powering up the extender 20, as long as the processing unit 35 is not sufficiently energized, this switch is in the open state and the first oscillating circuit 21 is not operational. This then allows the second oscillating circuit 31 to recover all the energy generated by the coupling with the RFID station 10, so as to more rapidly store sufficient energy for the processing unit 35. As soon as the processing unit 35 is sufficiently energized, the control means 37 close the power supply switch to obtain normal operation of the extender 20.

Preferably, the components L3 and C3 are chosen so that the resonance frequency of the second oscillating circuit 31 is substantially different from the nominal resonance frequency of the carrier of the electromagnetic signal emitted by the station 10. Thus, the second oscillating circuit 31 alone is deliberately poorly tuned so as not to overly disturb the overall performance of the antenna extender 20, but to just tap off the energy necessary for the operation of the processing unit 35, in particular during the self-parametrization phase. For example, if the nominal resonance frequency of the station 10 is equal to 13.56 MHz, then the resonance frequency of the second oscillating circuit 31 may be chosen equal to 15 MHz. Indeed, the better the second oscillating circuit 31 is tuned with the resonance frequency of the station 10, the more energy will be available to power the processing unit 35, but the less precise one will be in correctly tuning the first oscillating circuit 21, this being the most important for guaranteeing the performance of the extender 20.

The invention claimed is:

1. An antenna extender configured to be coupled electromagnetically to an RFID read/write station, the antenna extender comprising:
   a first oscillating circuitry and a second oscillating circuitry coupled to the first oscillating circuitry; and
   a processing circuitry which is powered by energy provided by the second oscillating circuitry when the antenna extender is placed near the RFID read/write station,
   wherein the processing circuitry includes:
      a measurement circuitry configured to measure a voltage across terminals of the second oscillating circuitry, and
      a control circuitry configured to vary a resonance frequency of the first oscillating circuitry as a function of a value of the measured voltage, so as to optimize frequency tuning between the antenna extender and the RFID read/write station.

2. The antenna extender as claimed in claim 1, wherein the control circuitry varies the resonance frequency of the first oscillating circuitry so as to obtain a maximum value of the measured voltage.

3. The antenna extender as claimed in claim 1, wherein the measurement circuitry measures a peak voltage at the terminals of the second oscillating circuitry.

4. The antenna extender as claimed in claim 3, wherein varying the resonance frequency of the first oscillating circuitry automatically varies a value of the peak voltage of the second oscillating circuitry.

5. The antenna extender as claimed in claim 3, wherein the measurement circuitry comprises a diode and a capacitor connected in parallel to measure the peak voltage at the terminals of the second oscillating circuitry.

6. The antenna extender as claimed in claim 1, wherein the measurement circuitry measures an effective voltage or a mean voltage at the terminals of the second oscillating circuitry.

7. The antenna extender as claimed in claim 1, wherein the first oscillating circuitry includes a variable capacitor, and the control circuitry varies a value of the variable capacitor.

8. The antenna extender as claimed in claim 1, wherein the variable capacitor includes one or more variable-capacitance diodes.

9. The antenna extender as claimed in claim 7, wherein the variable capacitor includes a plurality of capacitors linked in parallel and switchable with aid of bistable switches controlled by the control circuitry.

10. The antenna extender as claimed in claim 7, wherein the first oscillating circuitry further includes a fixed additional capacitor linked in parallel with the variable capacitor.

11. The antenna extender as claimed in claim 7, wherein the control circuitry varies the resonance frequency of the first oscillating circuitry by varying the value of the variable capacitor.

12. The antenna extender as claimed in claim 7, wherein the processing circuitry further includes a backup memory circuitry configured to store the value of the variable capacitor when a power supply is cut off.

13. The antenna extender as claimed in claim 1, wherein the first oscillating circuitry includes a variable coil, and the control circuitry varies a value of the variable coil.

14. The antenna extender as claimed in claim 1, wherein a first resonance frequency of the second oscillating circuitry is different from a second resonance frequency of an antenna of the RFID read/write station.

15. The antenna extender as claimed in claim 1, wherein the first oscillating circuitry and the second oscillating circuitry are electromagnetically coupled.

16. A system for exchanging data, comprising:
an RFID read/write station;
at least one RFID tag; and
an antenna extender configured to be coupled electromagnetically to the RFID read/write station to allow the RFID read/write station to be able to communicate with the at least one RFID tag by electromagnetic coupling, the antenna extender including:
a first oscillating circuitry and a second oscillating circuitry coupled to the first oscillating circuitry; and
a processing circuitry which is powered by energy provided by the second oscillating circuitry when the antenna extender is placed near the RFID read/write station,
wherein the processing circuitry includes:
a measurement circuitry configured to measure a voltage across terminals of the second oscillating circuitry, and
a control circuitry configured to vary a resonance frequency of the first oscillating circuitry as a function of a value of the measured voltage, so as to optimize frequency tuning between the antenna extender and the RFID read/write station.

17. A method for optimizing frequency tuning of an antenna extender coupled electromagnetically with an RFID read/write station, the antenna extender comprising a processing circuitry, a first oscillating circuitry, and a second oscillating circuitry, the method comprising:
measuring, using the processing circuitry, a voltage across terminals of the second oscillating circuitry; and
varying, using the processing circuitry, a resonance frequency of the first oscillating circuitry as a function of a value of the measured voltage, so as to obtain a maximum value of the measured voltage.

18. The method of optimization as claimed in claim 17, wherein the method is executed each time the processing circuitry is powered up.

19. The method of optimization as claimed in claim 17, wherein the method is executed periodically by the processing circuitry.

* * * * *